(12) United States Patent
Jacob et al.

(10) Patent No.: US 7,276,200 B2
(45) Date of Patent: Oct. 2, 2007

(54) APPARATUS AND METHOD FOR REMOVING A PART FROM MOLD

(75) Inventors: Jason E. Jacob, Richmond, KY (US); Jeff Brashears, Richmond, KY (US); Jeffery T. Hunt, Salt Lick, KY (US)

(73) Assignee: Toyota Motor Engineering & Manufacturing, North America, Inc., Erlanger, KY (US)

( * ) Notice: Subject to any disclaimer, the term of this patent is extended or adjusted under 35 U.S.C. 154(b) by 587 days.

(21) Appl. No.: 10/741,358

(22) Filed: Dec. 19, 2003

(65) Prior Publication Data

US 2005/0133961 A1      Jun. 23, 2005

(51) Int. Cl.
B29C 41/42      (2006.01)

(52) U.S. Cl. ....................... 264/334; 425/444

(58) Field of Classification Search .......... 264/334; 425/444; 294/65; 414/736–739, 752.1; 901/40
See application file for complete search history.

(56) References Cited

U.S. PATENT DOCUMENTS

| | | | |
|---|---|---|---|
| 1,110,409 A | | 9/1914 | Sutherland, Jr. |
| 3,102,751 A | | 9/1963 | Noble et al. |
| 3,411,640 A | | 11/1968 | Wallis |
| 3,826,485 A | | 7/1974 | Shindo |
| 3,866,764 A | | 2/1975 | Leiser |
| 4,129,328 A | | 12/1978 | Littell |
| 4,460,208 A | * | 7/1984 | Hoffman ....................... 294/65 |
| 4,527,783 A | | 7/1985 | Collora et al. |
| 4,549,843 A | * | 10/1985 | Jagusch et al. ......... 414/416.01 |
| 4,674,915 A | | 6/1987 | Shatto, Jr. |
| 4,685,714 A | * | 8/1987 | Hoke ......................... 294/81.2 |
| 4,743,159 A | | 5/1988 | Inamori |
| 4,804,173 A | | 2/1989 | Pol et al. |
| 5,076,564 A | | 12/1991 | Marass |
| 5,094,495 A | | 3/1992 | Littell |
| 5,388,952 A | * | 2/1995 | Hofele et al. ................ 198/375 |
| 5,452,981 A | | 9/1995 | Crorey et al. |
| 5,632,590 A | * | 5/1997 | Pearson et al. .............. 414/404 |
| 5,993,144 A | | 11/1999 | Inoue |
| 6,502,877 B2 | * | 1/2003 | Schick et al. .................. 294/65 |
| 6,626,629 B2 | * | 9/2003 | Herbermann et al. ........ 414/737 |
| 6,779,765 B2 | * | 8/2004 | Zheng et al. ............. 248/206.3 |
| 6,863,323 B2 | * | 3/2005 | Neveu ........................... 294/65 |

FOREIGN PATENT DOCUMENTS

JP      62-74818      *   4/1987

* cited by examiner

*Primary Examiner*—Jill L. Heitbrink
(74) *Attorney, Agent, or Firm*—Dinsmore & Shohl LLP

(57) ABSTRACT

An apparatus for removing a part from a mold includes a frame and a retrieving assembly having a member mount attached to the frame and a plurality of part retaining members attached to the member mount, at least two of the retaining members being offset from one another along a first axis. One or more of the part retaining members can also be adjustable relative to the mount to accommodate varying surfaces of parts to be removed. The apparatus for removing a part may further include a lock arrangement configured to secure the retrieving assembly in a retrieving position.

28 Claims, 3 Drawing Sheets

APPARATUS AND METHOD FOR REMOVING A PART FROM MOLD

FIELD OF THE INVENTION

This invention relates to an apparatus for removing a part from a mold. More particularly, this invention relates to an apparatus for retrieving a molded part and preventing reciprocation or unwanted movement of the part during removal.

BACKGROUND OF THE INVENTION

There are a multitude of parts for various products which are made of molded plastic or stamped metal, and which are produced on various machines such as injection or blow molding, vacuum forming, or metal stamping arrangements. For parts which are of higher value and/or larger overall size, physical take out devices (TOD's) are often used to remove the molded part from an open mold following the molding procedures. In many cases, the TOD is specifically made to conform to a particular molded part, and is matched carefully to the mold itself. Upon opening of the mold, the TOD is inserted to contact and grasp at least a portion of the surface of the molded part (e.g., by vacuum or suction pickup).

Issues arise with such TOD's in that a specific TOD is often required for each mold cavity, and when specifically designed for a particular molded part, must be changed out each time the mold itself is changed out. As such, an equal number of TOD's is required to match the number of molds utilized for a particular operation, and the down time, change out periods for mold changeovers, skilled technician labor and additional costs for the TOD's themselves are increased accordingly.

Another issue with previous TOD's is that because the vacuum or suction pickup devices (e.g. suction cups) are often aligned along common axes, the retrieved part is susceptible to rotation, movement or reciprocation relative to the TOD which may result in damage as the part undesirably contacts the mold or other components adjacent the mold.

As such, there is a desire for an apparatus capable of retrieving a molded part from a variety of molds while properly securing the part to optimize flexibility and part control and to minimize potential for part or equipment damage.

SUMMARY OF THE INVENTION

Accordingly, the present invention is intended to address and obviate problems and shortcomings and otherwise improve previous apparatuses for removing a part from a mold.

To achieve the foregoing and other objects and in accordance with the exemplary embodiments of the present invention an apparatus for removing a part from a mold comprises a frame and a retrieving assembly having a member mount attached to the frame and a plurality of part retaining members attached to the member mount, at least two of the retaining members being offset along a first axis.

To still further achieve the foregoing and other objects of the present invention, an apparatus for removing a part from a mold comprises a frame and a retrieving assembly having a member mount attached to the frame and a plurality of part retaining members attached to the member mount, at least two of the retaining members being offset along a first axis. The apparatus for removing a part further comprises a lock arrangement associated with at least one of the retaining members configured to selectively secure the retaining members in a retrieving position.

To yet further achieve the foregoing and other objects in accordance with other exemplary embodiments of the present invention, an apparatus for removing a part from a mold comprises a frame, and two retrieving assemblies each having a member mount with a plurality of part retaining members attached to the member mount, at least two of the retaining members being offset along a first axis. The apparatus for removing a part further comprises two lock arrangements associated with each member mount configured to selectively secure the retaining members in a retrieving position.

Still other embodiments, combinations, advantages and objects of the present invention will become apparent to those skilled in the art from the following descriptions wherein there are shown and described alternative exemplary embodiments of this invention for illustration purposes. As will be realized, the invention is capable of other different aspects, objects and embodiments all without departing from the scope of the invention. Accordingly, the drawings, objects, and description should be regarded as illustrative and exemplary in nature only and not as restrictive.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

FIGS. 3A-3C are top views of the apparatus of FIG. 1 wherein FIG. 3A illustrates a resting position, FIG. 3B illustrates the apparatus upon initial contact with the art and FIG. 3C illustrates a retrieving position.

DETAILED DESCRIPTION OF EXEMPLARY EMBODIMENTS

Figure 1:
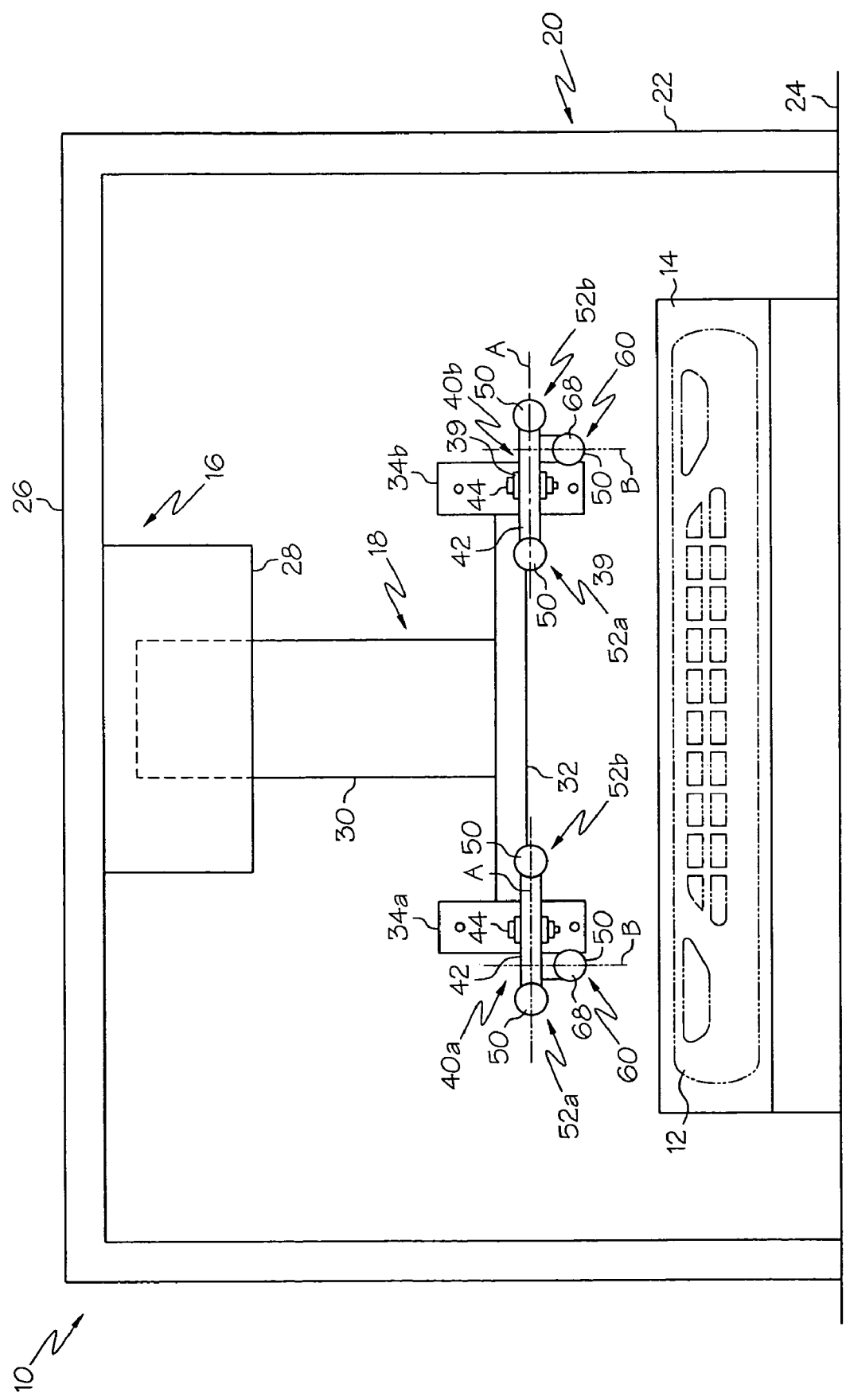
FIG. 1 is a front elevational view of an exemplary apparatus of the present invention for removing a part from a mold.

Referring to the drawing figures in detail, wherein like numerals indicate the same or corresponding elements in the drawing figures, FIG. 1 illustrates an exemplary take out device (TOD) apparatus 10 for removing a part (e.g. 12) from a mold 14 (part 12 shown in phantom lines within mold 14). As shown in FIG. 1, TOD 10 comprises a superstructure assembly 16 for supporting a frame 18. Superstructure assembly 16 is shown as being attached to a base 20 which might compromise vertically extending posts 22 shown as being positioned on a surface or floor 24. Transverse beam 26 can be secured atop vertical posts 22 and would function in this example as a mount for frame caffiage 28. Frame 18 is shown in FIG. 1 as comprising a column 30 extending downwardly from carriage 28. As can be appreciated, any mounting arrangement for situating the apparatus 10 adjacent a mold for operation could be substituted for this exemplary base arrangement. Generally, as described later herein, carriage 28 functions to selectively move frame 18 and retrieving assemblies 40*a* and 40*b* into and out of a retrieving position (the position where a part may be removed) adjacent mold 14 to remove a part 12 therefrom.

Column 30 may be raised or lowered within carriage 28 to selectively position frame 18 and retrieving assemblies 40*a* and 40*b* into a retrieving position. This might be facilitated by hydraulic or pneumatic cylinders in conjunction with an extendable column, such as a telescoping arm or lineage assembly. Frame 18 is illustrated in a resting position in FIG. 1 (not in position to retrieve a part 12). Upward, downward, and lateral movement (or, more generally, roll, pitch and yaw) of the frame within carriage 28 may be accomplished by, for example, a belt drive, hydraulics, pneumatics or other motors operated by any configuration of controls. Also, it should be understood that superstructure assembly 16 including base 20, carriage 28 and frame 18 illustrated in FIG. 1 is not critical and may be accomplished by any number of arrangements configured to selectively position frame 18 and retrieving assemblies 40*a* and 40*b* into a retrieving position so that the part 12 may be removed from the mold 14.

Still referring to the examples of FIG. 1, an arm mount plate 32 may be secured to column 30 for mounting arms 34*a* and 34*b*. While FIG. 1 illustrates arm plate mount 32 rigidly secured to column 30, it is contemplated that arm plate mount 32 may be pivotally or otherwise movably secured in another embodiment. As described further below, arms 34*a* and 34*b* can be used to secure retrieving assemblies 40*a* and 40*b*. For example, referring to the embodiment of FIG. 2, arms such as 34*a* and 34*b* (34*b* shown) are generally T-shaped so that the proximal end 36 of arm 34*b* may be horizontally mounted to arm mount plate 32 and secured with fasteners 38. Distal end 37 of arm 34*b* includes a bracket 39 for securing a member mount 42 thereto. Similar to superstructure 16, arm mount plate 32 and arms 34*a* and 34*b* may comprise any variety of arrangements configured to secure retrieving assemblies such as 40*a* and 40*b*, and to selectively move retrieving assemblies 40*a* and 40*b* into and out of a retrieving position (e.g. FIG. 3C).

Figure 2:
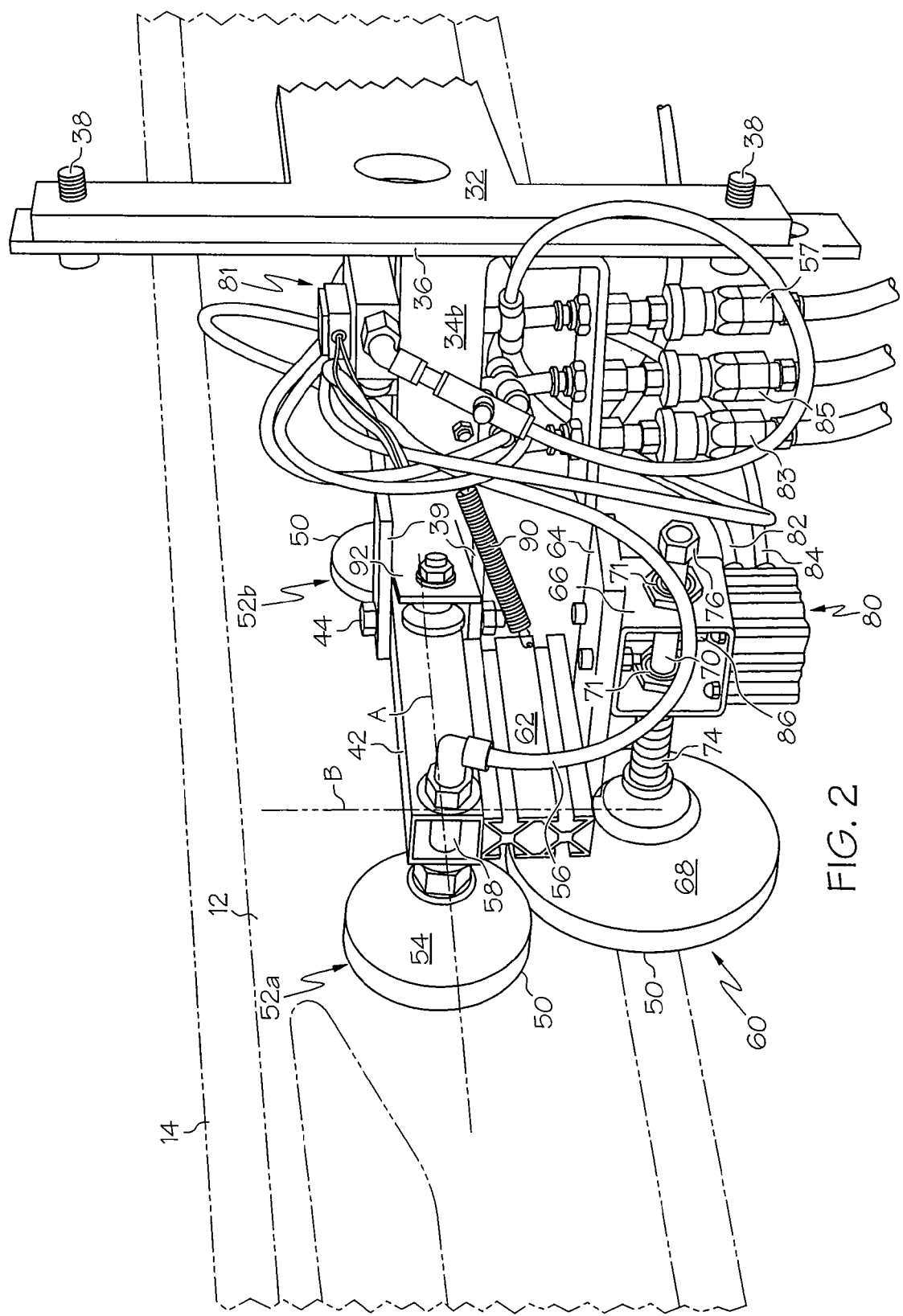
FIG. 2 is a rear perspective view of an exemplary retrieving assembly as shown in FIG. 1 in accordance with the present invention.

As illustrated in FIGS. 1 and 2, retrieving assemblies 40*a* and 40*b* (40*b* shown in FIG. 2) comprise a member mount 42 which can be pivotally secured to arms 34*a* and 34*b* with pin 44. As discussed later herein, depending on the position of the lock arrangement 80 (e.g. associated with the part retaining member 50, member mount 42 or both), member mount 42 may also be rigidly secured to arms 34*a* and 34*b* as appropriate in other embodiments. It is also contemplated that retaining members 50 (discussed later) may be directly mounted to arm mount plate in another embodiment. Member mount 42 is illustrated as comprising a straight post. In another embodiment, ends of member mount 42 may be manipulated either structurally or automatically in a variety of shapes and according to a particular part to be removed.

Retrieving assemblies 40*a* and 40*b* are also illustrated as comprising two or more part retaining members 50 secured to member mount 42. Referring to FIG. 2 for example, part retaining members 50 of arm 34*b* are shown as including two suction cup assemblies (e.g. 52*a* and 52*b*) and one bumper assembly (e.g. 60). In another embodiment, part retaining members 50 may comprise any combination of suction cup assemblies, bumper assemblies and/or other arrangements for contacting and/or grasping a part as desirable necessary to adequately retrieve and secure a part from a mold.

Suction cup assemblies 52*a* and 52*b* can, for example, include a suction cup 54 integrated with an air hose 56 through air cylinder 58 (best shown associated with 52*a*). In this example, air cylinder 58 extends through a generally hollow member mount 42. Suction cup 54 may be comprised of rubber, silicone, plastic or any other flexible material configured to create a seal between itself and a surface (e.g. molded or stamped metal part). As discussed later herein, suction cup assemblies such as this can function to create a seal against a surface (e.g. a part 12) through vacuum air pressure channeled through air hose 56 or other supply lines and air cylinder 58. As illustrated in FIG. 2, air hose 56 may be connected to air valve assembly 57 which supplies air to the hose as appropriate. In another embodiment, it is contemplated that suction cup assemblies 52*a* and 52*b* or at least some of the retaining members may use only a seal created between an appropriate suction cup and a surface (e.g. part 12) such as by natural mechanical pressure, thereby alleviating the need for additional vacuum pressure.

As illustrated in FIG. 1, and as discussed above, each member mount 42 may comprise a suction cup or other retaining assembly on each of its outer ends. It is believed that this arrangement provides the most flexible retrieving capability (e.g. ability to retrieve a variety of parts from different molds) by enabling more adaptability and surface contour conformation. In addition, although suction cup assemblies 52*a* and 52*b* and suction cups 54 are illustrated as rigidly secured to member mount 42, it is contemplated that each of these assemblies and cups 54 may be movable about member mount 42 and/or relative to frame 18 so as to allow for proper adjustment of part retaining members 50 to a desired position. Such adjustment may be accomplished through manual adjustment of brackets and/or controlled computerized axis control of the retaining members. In the case of computerized axis control, a computer program may automatically adjust the retaining members 50 according to the type of part to be retrieved.

As illustrated in FIG. 2, bumper assembly 60 may be secured to member mount 42 by, for example, extension plate 62. Extension plate 62 may comprise any arrangement and size configured to mount bumper assembly 60 in a desired position. Also, similar to suction cup assemblies 52*a* and 52*b*, bumper assemblies 60 may be adjustable relative to member mount 42 and/or frame 18.

In the embodiment of FIG. 2, bumper assembly 60 is shown as comprising an extension arm 64 mounted to extension plate 62. Extension arm 64 functions as a mount for bumper bracket 66 and to facilitate general positioning of bumper 68. As illustrated in the example of FIG. 2, bumper 68 must comprise a plunger-like device with an outwardly extending cylindrical rod 70. In another embodiment, bumper may be substituted for a suction cup or any other device configured to appropriately prevent reciprocation (discussed below) of a part once retrieved from a mold. Rod 70 extends through apertures 71 of bracket 66 and can move therein between a normally extended position and whatever location results when the TOD is in a retrieving position. Bumper assembly 60 also comprises a bumper bias 74 around rod 70 positioned between bumper 68 and bracket 66. Bumper bias 74 may comprise a spring or other such biasing member and functions to bias bumper outwardly to its normally extended position away from bracket 66. If desired, rod 70 may comprise a nub or stop 76 at its outer most end opposite bumper 68 which functions to prevent rod 70 from slipping through bracket 66 when bumper bias 74 forces bumper 68 away from bracket 66.

As illustrated in FIGS. 1 and 2, bumper assembly 60 of this example is offset in a direction along axis B as compared to suction cup assemblies 52*a* and 52*b* which are generally aligned along axis A. More particularly, bumper assembly is spaced somewhat beneath suction cup assemblies 52*a* and 52*b*. In addition, bumper assembly 60 is also offset in a direction parallel to axis A from either suction cup assembly 52*a* and 52*b*. By positioning bumper assembly 60 beneath suction cup assemblies 52*a* and 52*b*, the part 12, once retrieved from the mold 14, is prevented from rotating, moving or reciprocating and potentially striking another object thereby damaging the part or otherwise interfering with molding or part extraction processes. By positioning the bumper assembly 60 somewhere in the middle of suction cup assemblies and providing selective locking, the retrieving assembly may retrieve a variety of different parts because the bumper assembly is configured to self-adjust. More particularly, bumper assembly may self-adjust to a variety of different parts because rod 70 of bumper assembly is movable. For example, one type of part may force rod 70 75% of its length within bracket 66 until properly gripped, whereas another, larger, part may force rod 70 85% of its length into bracket 66 until the part is properly gripped.

It should be understood that suction cup assemblies 54*a* and 54*b* and bumper assembly 60 may be offset at any position along the axises described herein to appropriately retrieve a part. More particularly, it is contemplated by the present invention that suction cup assemblies may provide one aspect of support (e.g. gripping of the part and prevention of lateral movement), whereas bumper assemblies may provide a second aspect of support (e.g. prevention of downward reciprocation of the part about suction cup assemblies). In such embodiment, suction cup assemblies and bumper assemblies may alone be sufficient to remove a part from a mold once the suction cup assemblies and bumper assemblies are in a retrieving position.

Yet another aspect of support can be achieved by lock arrangement (discussed later herein) associated with the TOD. As such, any combination of suction cup assemblies, bumper assemblies and lock arrangements offset as described herein can be utilized to effectively retrieve, secure and remove a part.

If desired, other components may be associated with the retrieving assemblies 40*a* and 40*b* to further facilitate movement of the retrieving assemblies into resting (e.g. FIG. 1) and retrieving (e.g. FIG. 2) positions. For example, a swing mechanism 90 (see FIG. 2) may be secured between extension plate 62 and arm mount 34*b* (and 34*a*) to prevent uncontrolled rotation of member mount 42 about pin 44. Swing mechanism 90 is illustrated as comprising a coiled spring. The function of the spring is to align member mount 42 and corresponding retrieving members 50 in an about face position toward the mold 12. In such embodiment, it may also be desirable to integrate a swing stop 92 to prevent member mount from becoming misaligned as a result of force from swing mechanism 90. Any number of arrangements could alternatively be utilized to pre-set the retrieving assembly in an optimal "ready" attitude for aligning with a part to be extracted.

As seen in FIG. 2, the bumper assembly 60 may also include a lock arrangement 80 associated with the bumper assembly 60. As described below, by associated it is meant that the lock arrangement is in contact with the bumper assembly. Such contact in one embodiment may work to selectively hinder movement of some device of the bumper assembly. As shown in FIG. 2, lock arrangement 80 of this example comprises a pneumatically operated lock. More particularly, lock arrangement 80 is configured so that when bumper assembly 60 reaches a desired position (retrieving position), air pressure controlled by air control assembly 81 including pneumatic air hoses 82 and 84, works to force locking pin 86 against extension rod 70 thereby preventing any further reciprocation of extension rod 70 about bracket 66. The desired position may be, for example, predetermined based on an exact position programmed within a control, or in another embodiment, an acceptable position based on feedback from proximity and/or pressure sensors. As illustrated in FIG. 2, pneumatic air hoses 82 and 84 may be connected to pneumatic air valves 83 and 85 which supplies and releases air to pneumatic air hoses 82 and 84.

It is also contemplated that by using pneumatic devices to provide a vacuum for the suction cups and for selectively locking the adjustable arrangements in a clamped position, the devices may also be able to take advantage of airflow control sensors such as venturi arrangements to automatically sense when a suction cup has come into contact with the part surface to trigger the locking mechanism procedure. Utilizing a connected power source of this type (e.g., pneumatics), the part can later be simultaneously released from the TOD while unlocking the adjustment mechanisms to allow all grasping elements to automatically return to their "resting" position, ready for the next part extraction procedure.

While the spring-loaded and pneumatic locking self-adjusting arrangement described may be desirable for some applications, it should be kept in mind that other arrangements for tending to situate the grasping elements to a predetermined "retrieving" position, allowing for self-adjusting accommodation of part shape sizes, and selectively locking the retaining member in adjusted retrieving positions can be equally implemented in alternate configurations by those skilled in the art. Consequently, any combination of structures and processes for directing an adjustable retaining member into a predetermined extended or home position and allowing for self-adjusting movement and selective locking to accommodate different part shapes, contours and sizes may be used.

Figure 3A:
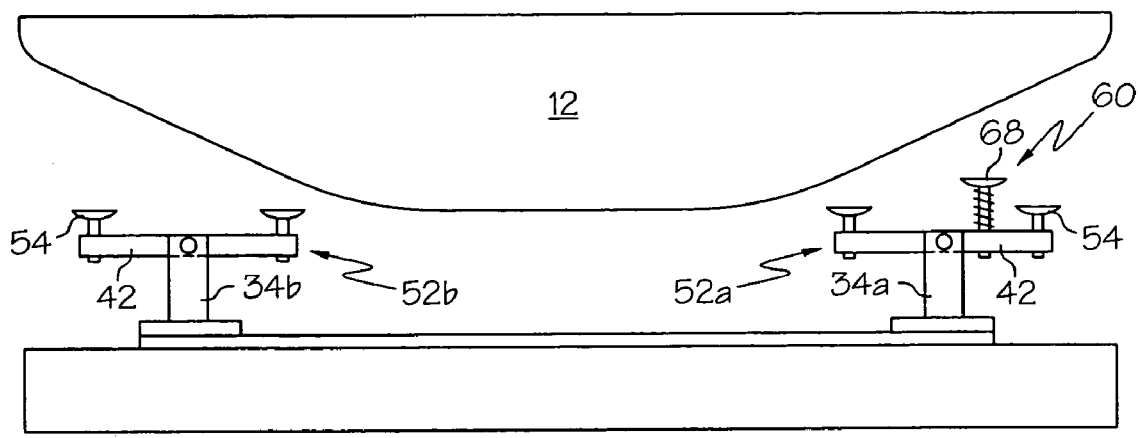
Figure 3B:
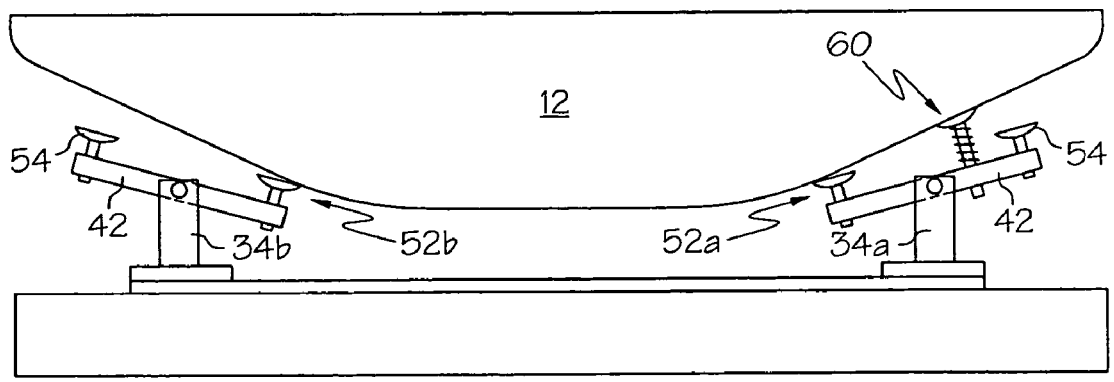
Figure 3C:
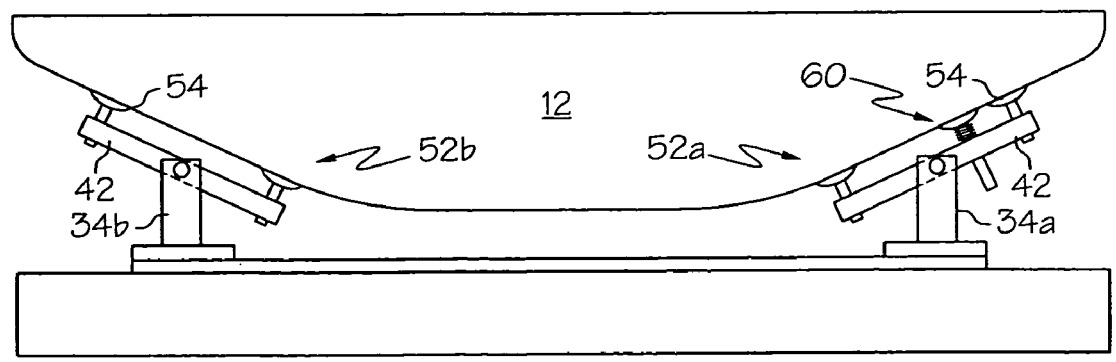

Referring to FIG. 3A-3C, the TOD arrangement may have two positions (e.g. a resting position (FIG. 3A) and a retrieving position (FIG. 3C). In operation, as the TOD arrangement is brought into close proximity with the surface of a molded part (e.g. FIG. 3B), one of the suction cup assemblies (e.g. 52*b*) will interface (e.g. contact) with the molded part followed by contact with bumper assembly 60 (e.g. FIG. 3B). Further relative movement between the TOD arrangement and the molded part surface will automatically rotate the member mount 42 and the other suction cup assembly (e.g. 52*a*) into contact with the part (e.g. FIG. 3C). The automatic adjustability of the spaced suction cup assemblies can also be provided in other ways, such as by providing a variably positionable cylinder attachment or plunger arrangement of one of the suction cup assemblies to the member mount which allows the automatic adjustment of the first-to-contact suction cup, thereby providing automatic adjustment of the suction cups so that they can all come into effective contact with respective portions of the molded part. As can be appreciated and as discussed above, by providing a plurality of retaining members such as the suction cups shown in the illustrations in an automatically adjustable arrangement, a single TOD setup can accommodate a wide variety of molded part shapes, contours and sizes without any significant alteration of the overall setup or controls, while enabling the TOD device to ensure multiple point contact/pickup of each part.

Referring to FIGS. 2-3, once the suction cup assemblies each contact the molded part surface, a seal may be provided or augmented, for example, by creating a vacuum through air hose 56. The vacuum pressure allows the suction cup to more effectively grip the part. As the TOD continues to move forward (e.g. moving toward retrieving position), rod 70 of bumper assembly 60 continually is slid along its axis until the part shape has been accommodated and all retaining members (e.g. suction cups and bumpers) have been brought into contact with the part surface. The TOD may make an additional inward movement if desired to create a desired preload. The pre-load may help further decrease any movement of the part relative to the TOD.

Once in proper position to retrieve the part (i.e., "retrieving position"), the lock arrangement 80 (pneumatic cylinder) can be activated (e.g. to force a locking pin 86 into engagement with the rod 70) to prevent further movement. As can be understood, once locked in place, the retaining members of the TOD can extract the plastic molded or stamped sheet metal part from a mold and move it to a subsequent work area or position. Even with heavier parts, the effectively locked arrangement and the offset nature of some of the contact points provides stable support of the part for reliable controlled handling. The part can be manipulated by the apparatus, such as for placement on a rack conveyor, or other part handling setup. To release the part, the grasping elements of the apparatus (e.g. suction cup 54) is released by termination of the vacuum and/or introduction of an over-pressure to facilitate positive disengagement.

It is contemplated that other embodiments of the invention may incorporate the lock arrangement described above or similar lock arrangements at other locations about the TOD. For example, it may be desired to incorporate a lock arrangement with member mount 42. In such embodiment, the retrieving assemblies 52a and 52b might be locked in a predetermined configuration or attitude prior to contacting the part. This may further prevent a retrieved part from moving relative to the TOD when being moved. Also, such embodiment may eliminate the need for two retrieving assemblies. More particularly, in an embodiment with locking mechanisms integrated with the bumper and the member mount, one retrieving assembly having a member mount spanning the length of the part and having corresponding retaining members mounted thereto may adequately retrieve a part and prevent rotation, reciprocation, side to side movement or other undesirable part freedom. Similarly, the lock arrangement can further be associated, for example, in arm mount plate 32 in another embodiment. Of course, it should be understood that the present invention may not include a lock arrangement as described herein as suction cup assemblies and bumper assemblies may provide enough stability to retrieve and transport a part in some application.

Accordingly, one of many features of the present invention is that many different contours, and shapes can be automatically accommodated by the present invention. By providing the bumper assembly in a spaced, non-axial location with respect to at least one of the suction cup assemblies, a variety of parts may be securely retrieved while obviating unwanted part movement. Also, by allowing for locking the self-adjusted retaining members in place, it will be understood that the TOD can further securely remove a molded part while supporting it in a preferred orientation. The self-adjusting lock arrangement 80 enables the TOD to accommodate to new part shapes and contours automatically, while maintaining an ability to extract and hold a molded part in a particular orientation to prevent damage, facilitate handing and/or to properly orient the part for subsequent operations.

The foregoing description of the various embodiments of the invention has been presented for the purposes of illustration and description. It is not intended to be exhaustive or to limit the invention to the precise form disclosed. Many alternatives, modifications and variations will be apparent to those skilled in the art of the above teaching. For example, the TOD in accordance with the present invention may include any number of retaining member aligned in a variety of axes. Also, the TOD may include one or multiple lock arrangements configured to secure a part removed from a mold during transport of that part. Accordingly, while some of the alternative embodiments of the TOD have been discussed specifically, other embodiments will be apparent or relatively easily developed by those of ordinary skill in the art. Accordingly, this invention is intended to embrace all alternatives, modifications and variations that have been discussed herein, and others that fall within the spirit and broad scope of the claims.

What we claim is:

1. A method for removing a part from a mold comprising the steps of:
   (a) providing a retrieving assembly having a plurality of part retaining members, at least two of said retaining members being offset along a first axis, wherein at least one of said retaining members comprises a bumper assembly comprising a movable spring loaded rod;
   (b) bringing said retrieving assembly into contact with said part;
   (c) gripping said part with at least one of said part retaining members;
   (d) providing a lock arrangement configured to selectively secure said retaining members in a retrieving position;
   (e) locking said retaining members in said retrieving position with said lock arrangement; and
   (f) removing said part from said mold.

2. The method as in claim 1, further comprising the step of preventing reciprocation of said part with one of said retaining members.

3. The method of claim 1, further comprising the step of providing a pivotal member mount to which a plurality of retaining members are operably attached.

4. The method of claim 3, further comprising the step of providing a second lock arrangement associated with said member mount.

5. An apparatus for removing a part from a mold comprising:
   (a) a frame; and
   (b) a retrieving assembly attached to said frame having a member mount and a plurality of part retaining members attached to said member mount, at least two of said retaining members being offset along a first axis, wherein at least one of said retaining members comprises a bumper assembly, said bumper assembly being biased away from said frame and configured to self adjust the retrieving assembly to retrieve a variety of sizes of parts.

6. The apparatus of claim 5, further comprising a lock arrangement configured to selectively secure said retrieving assembly in a retrieving position.

7. The apparatus of claim 5, further comprising a second retrieving assembly attached to said frame.

8. The apparatus of claim 5, wherein said member mount is pivotally attached to said frame.

9. The apparatus of claim 5, wherein at least two of said retaining members are offset along a second axis, wherein said second axis is oriented at an angle with respect to said first axis.

10. The apparatus of claim 5, wherein at least some of said retaining members comprise a suction cup assembly.

11. The apparatus of claim 6, wherein said lock arrangement is configured to selectively maintain an adjustment position of at least one of said part retaining members.

12. The apparatus of claim 6, wherein said lock arrangement is associated with said member mount.

13. The apparatus of claim 6, wherein said lock arrangement comprises a pneumatic lock.

14. An apparatus for removing a part from a mold comprising:
(a) a frame;
(b) a retrieving assembly attached to said frame having a member mount and a plurality of part retaining members attached to said member mount, at least two of said retaining members being offset along a first axis, wherein at least one of said retaining members comprises a bumper assembly comprising a movable spring loaded rod; and
(c) a lock arrangement associated with at least one of said retaining members configured to selectively secure said retaining members in a retrieving position.

15. The apparatus of claim 14, further comprising a second retrieving assembly attached to said frame.

16. The apparatus of claim 14, wherein said member mount is pivotally attached to said frame.

17. The apparatus of claim 14, wherein at least two of said retaining members are offset along a second axis.

18. The apparatus of claim 14, wherein one or more of said part retaining members comprise a suction cup assembly.

19. The apparatus of claim 14, wherein said one of said retaining members comprises a bumper assembly.

20. The apparatus of claim 19, wherein said bumper assembly comprises a bumper bias.

21. The apparatus of claim 14, further comprising a second lock arrangement associated with said member mount.

22. The apparatus of claim 14, wherein said lock arrangement comprises a pneumatic lock.

23. An apparatus for removing a part from a mold comprising:
(a) a frame;
(b) two retrieving assemblies attached to said frame, each having a member mount and a plurality of part retaining members attached to said member mounts, at least two of said retaining members on each of said member mounts being offset from one another along a first axis, wherein at least one of said retaining members comprises a bumper assembly; and
(c) two lock arrangements each associated with at least one of said retaining members and configured to selectively secure said retaining members in a retrieving position.

24. The apparatus of claim 23, wherein each of said member mounts is pivotally attached to said frame.

25. The apparatus of claim 23, wherein at least two of said retaining members are offset from one another along a second axis.

26. The apparatus of claim 23, wherein one or more of said part retaining members comprise a suction cup assembly.

27. The apparatus of claim 23, wherein said bumper assembly comprises a bumper bias.

28. The apparatus of claim 23, wherein said lock arrangement comprises a pneumatic lock.

* * * * *